US011969845B2

(12) United States Patent
Wang et al.

(10) Patent No.: US 11,969,845 B2
(45) Date of Patent: Apr. 30, 2024

(54) QUICK MEASUREMENT MODULE

(71) Applicant: HIWIN MIKROSYSTEM CORP., Taichung (TW)

(72) Inventors: Chen Yi Wang, Taichung (TW); Zong Ting Sie, Taichung (TW); Kou I Szu, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 1109 days.

(21) Appl. No.: 16/794,158

(22) Filed: Feb. 18, 2020

(65) Prior Publication Data

US 2021/0252660 A1 Aug. 19, 2021

(51) Int. Cl.
| *B60R 21/36* | (2011.01) |
| *B23Q 15/24* | (2006.01) |
| *B23Q 17/24* | (2006.01) |
| *G01B 11/00* | (2006.01) |
| *B60R 21/214* | (2011.01) |

(52) U.S. Cl.
CPC ......... *B23Q 17/2485* (2013.01); *B23Q 15/24* (2013.01); *G01B 11/002* (2013.01)

(58) Field of Classification Search
CPC .............................. B60R 21/36; B60R 22/26
See application file for complete search history.

(56) References Cited

U.S. PATENT DOCUMENTS

| 2008/0000957 | A1* | 1/2008 | Zhang | G05B 19/21 |
| | | | | 235/103 |
| 2010/0138006 | A1 | 6/2010 | Mies et al. | |
| 2012/0084989 | A1 | 4/2012 | Pettersson et al. | |
| 2016/0101710 | A1* | 4/2016 | Bonk | B60N 2/0252 |
| | | | | 297/217.2 |
| 2017/0080826 | A1* | 3/2017 | Bonk | B60N 2/06 |

FOREIGN PATENT DOCUMENTS

| CN | 101458102 A | 6/2009 |
| CN | 102840980 A | 12/2012 |
| CN | 205940484 U | 2/2017 |
| CN | 108693123 A | 10/2018 |
| DE | 19810333 A1 | 9/1999 |
| DE | 60114397 T2 | 8/2006 |

(Continued)

*Primary Examiner* — Kawing Chan
*Assistant Examiner* — Charles S Laughlin
(74) *Attorney, Agent, or Firm* — Guice Patents PLLC

(57) ABSTRACT

In a quick measurement module provided by the present invention, a first distance sensing unit and a second distance sensing unit are provided individually on a movable seat, so that when the movable seat is displaced along a linear shifting axis, the first distance sensing unit senses the distance from the first reference plane, and meanwhile, the second distance sensing unit senses the distance from the second reference plane, so as to sense the linearity accuracy in movement of the movable seat with respect to the first reference plane and the second reference plane. The first reference plane and the second reference plane are spaced apart by an angle other than a right angle, so that the linearity accuracy in movement in the two different planes, such as the horizontal linearity accuracy and vertical linearity accuracy, of the movable seat can be obtained through sensing.

9 Claims, 7 Drawing Sheets

(56) References Cited

FOREIGN PATENT DOCUMENTS

| | | | |
|---|---|---|---|
| JP | 1998198428 | A | 7/1998 |
| JP | 2004286710 | A | 10/2004 |
| JP | 5562150 | B2 | 1/2012 |
| KR | 1020140085999 | A | 7/2014 |
| KR | 200476625 | Y1 | 10/2014 |
| TW | I270659 | | 10/2006 |
| TW | 200643373 | A | 12/2006 |

* cited by examiner

QUICK MEASUREMENT MODULE

BACKGROUND OF THE INVENTION

1. Field of the Invention

The present invention relates to the technique of detection of movement of an object, and more particularly to a quick measurement module capable of quick measurement of the vertical and horizontal linearity in the linear movement of the object.

2. Description of the Related Art

In the case of using a motion mechanism such as a linear slide rail or a motion platform as a motion unit for operation of processing machinery, the accuracy of the movement directly affects the processing quality of the object to be processed. Therefore, in prior art, before the motion mechanisms mentioned above are applied as the motion unit for the processing machinery, the accuracy of movement of these motion mechanisms is measured through detection techniques such as laser interferometers. Only motion mechanisms meeting the requirements of quality control can be used as the motion unit for the processing machinery.

Despite of its good reliability in the accuracy of detection, the technique of quality control through laser interferometers as described above has low efficiency due to its complicated detection processes.

SUMMARY OF THE INVENTION

In view of this, it is the main object of the present invention to provide a quick measurement module capable of quick detection of the linearity accuracy and repetition accuracy of the object under detection without the complication and inconvenience of laser and mirror group arrangement, thereby allowing quick operation of quality control of products.

In order to achieve the object mention above, in a quick measurement module provided by the present invention, a first distance sensing unit and a second distance sensing unit are provided individually on a movable seat, so that when the movable seat is displaced along a linear shifting axis, the first distance sensing unit senses the distance from the first reference plane, and meanwhile, the second distance sensing unit senses the distance from the second reference plane, so as to sense the linearity accuracy in the movement of the movable seat with respect to the first reference plane and the second reference plane. The first reference plane and the second reference plane are spaced apart from each other by an angle other than a right angle, so that the linearity accuracy in movement in the two different planes, such as the horizontal linearity accuracy and vertical linearity accuracy, of the movable seat can be obtained through sensing.

Further, the quick measurement module may also include a position sensing unit configured to sense the position of the movable seat so as to acquire the position information of the movable seat and have it combined with the information of the sensed linearity accuracy in movement so as to acquire the repetition accuracy of the movable seat, thereby allowing quick quality control operation of detection of the object under detection.

For detection of the object under detection by the quick measurement module, the movable seat is secured to the object under detection so that the movable seat moves along with the object under detection.

To allow repeated detection of the object under detection, the quick measurement module has a stationary seat as the base for arrangement of other members and is provided with a space that can be easily positioned for placing the object under detection, so that the quick measurement module can be easily jointed to the object under detection to facilitate the operation of detection. The stationary seat has a stationary seat body, and the first reference plane and second reference plane are arranged individually on the stationary seat body and extend linearly along the shifting axis.

To facilitate jointing of the quick measurement module to the object under detection, the movable seat may further include a movable seat body and a joint face on one side of the movable seat body, so that the joint face of the movable seat can be quickly pressed against the object under detection.

The first distance sensing unit and second distance sensing unit are photosensors that can sense the distance from the first reference plane and second reference plane without contact therewith. More specifically, these photosensors may be laser locators.

Moreover, in order to avoid impact on the detection accuracy from the momentum in movement of the object under detection during measurement by the quick measurement module, the quick measurement module may further include a rectification mechanism configured to rectify the position of the movable seat with respect to the stationary seat body, so as to ensure the stability of the movable seat during its movement along with the object under detection and prevent it from swaying during movement due to the momentum or mounting deviations, thereby ensuring correctness of the sensed information that is obtained. To this end, the rectification mechanism provides a suitable force to the movable seat to enable the movable seat to counteract an undesired acting force that is exerted in a direction other than the shifting axis during the movement.

Further, the rectification mechanism has a guide rail provided on the stationary seat body and extending linearly along the shifting axis, a slider provided slidably on the guide rail, an arm having one end secured to the slider and the other end protruding above the movable seat, a jointer secured to the movable seat, and a flexible member bridged between the arm and the jointer.

The flexible member is in the shape of a sheet having a thickness perpendicular to the shifting axis.

DETAILED DESCRIPTION OF THE PREFERRED EMBODIMENTS

Figure 1:
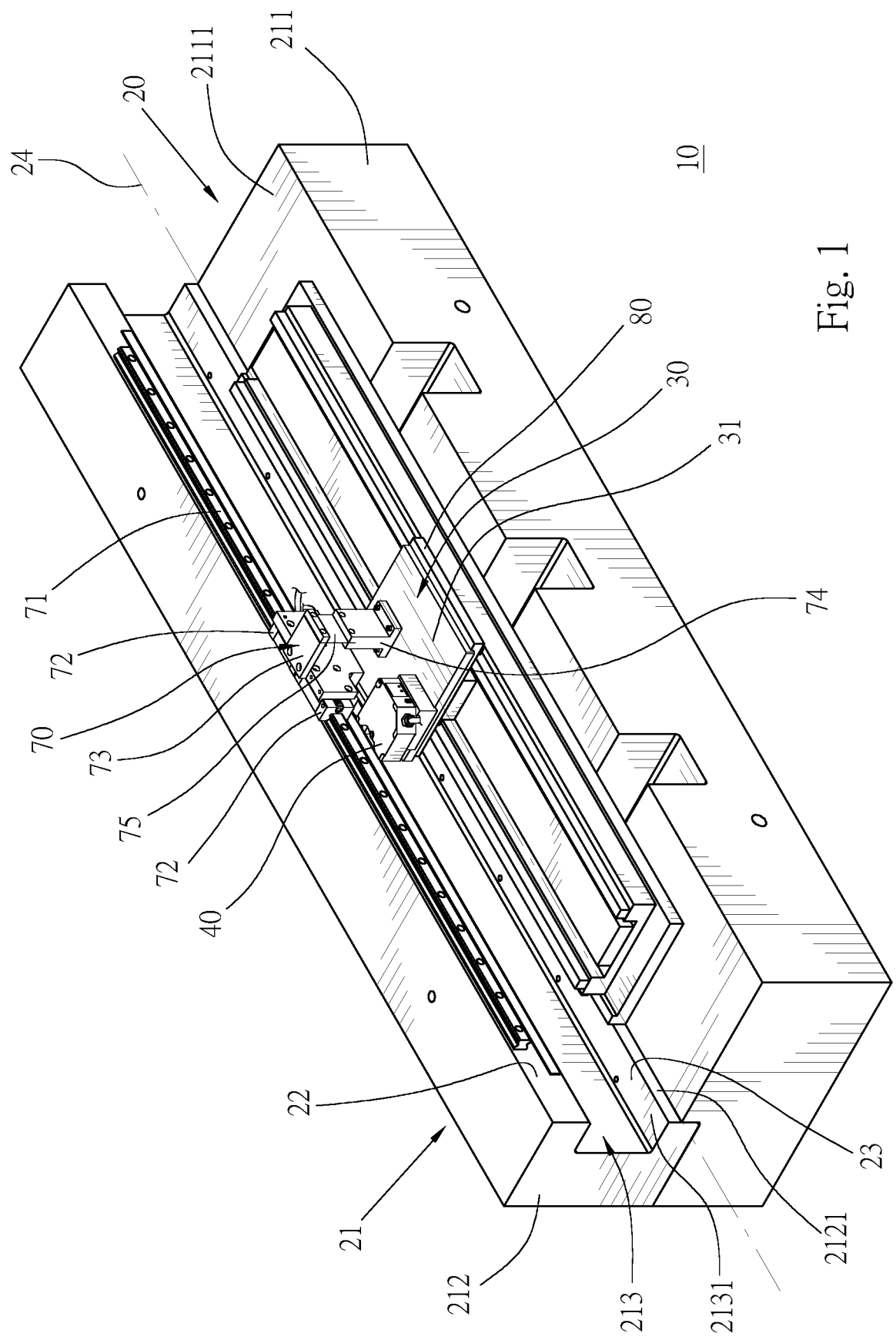
FIG. 1 is a three-dimensional view of a quick measurement module according to a preferred embodiment of the present invention.
Figure 2:
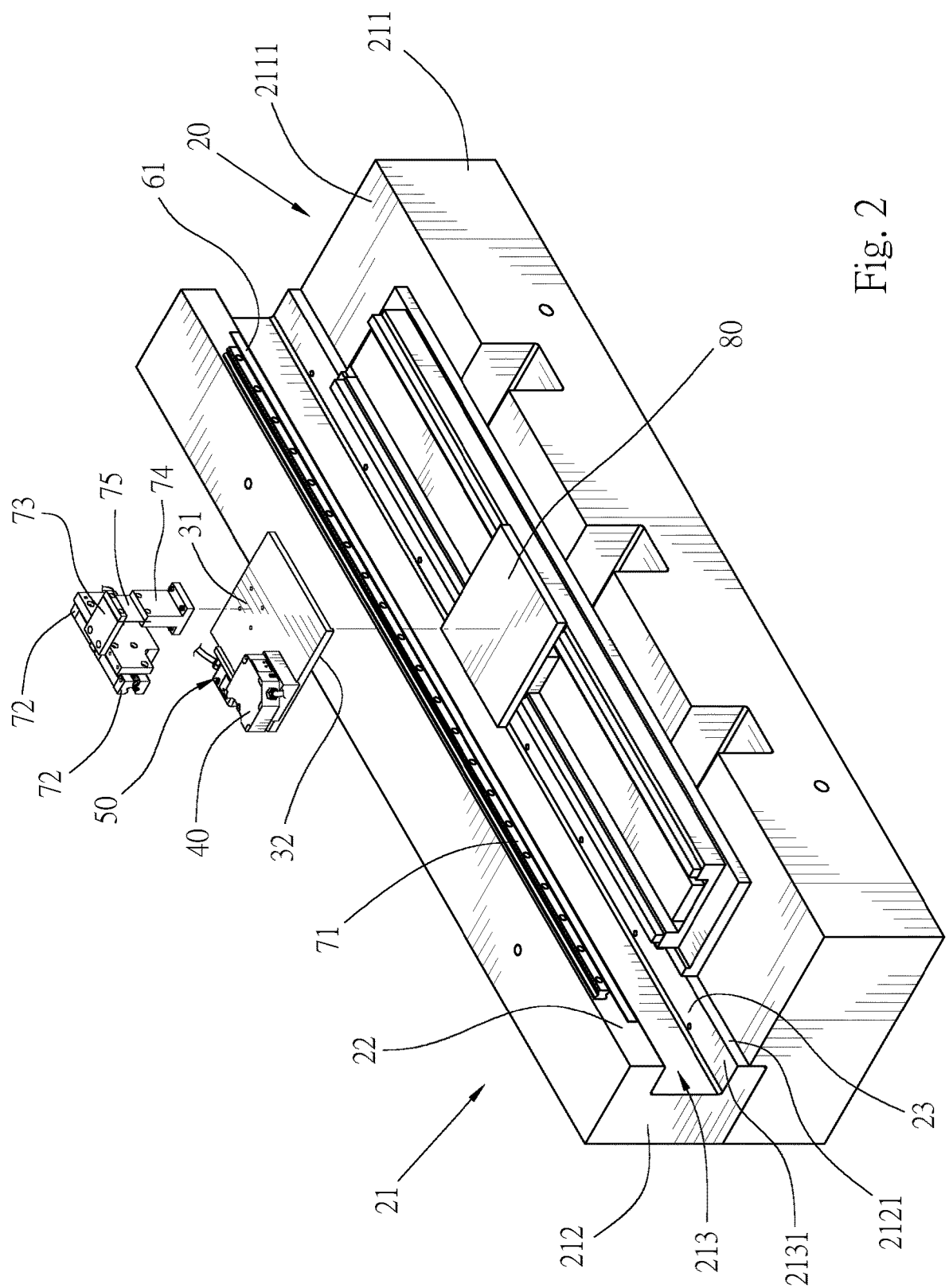
FIG. 2 is an exploded view of a quick measurement module according to a preferred embodiment of the present invention.
Figure 3:
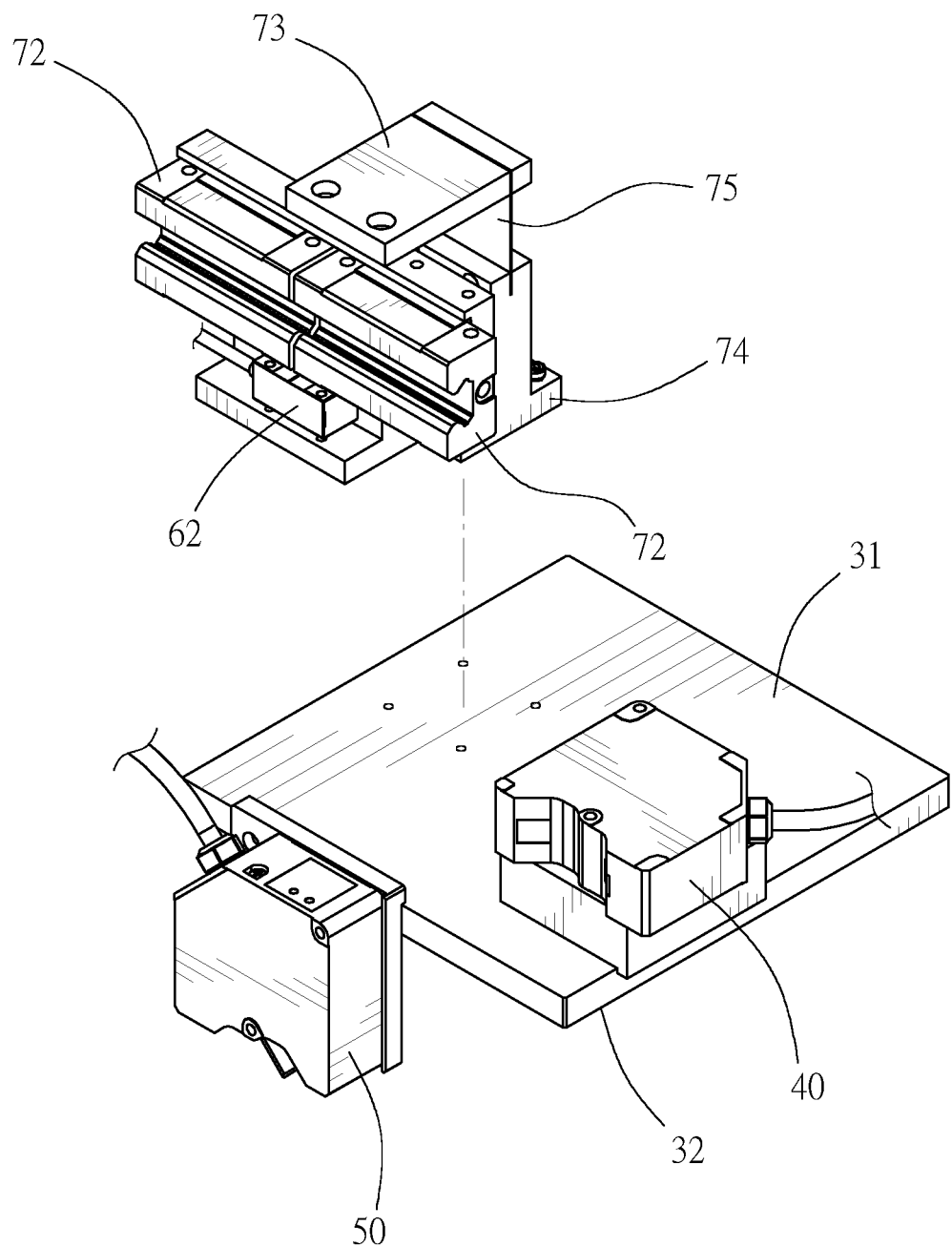
FIG. 3 is an enlarged exploded view of some elements of a quick measurement module according to a preferred embodiment of the present invention.
Figure 4:
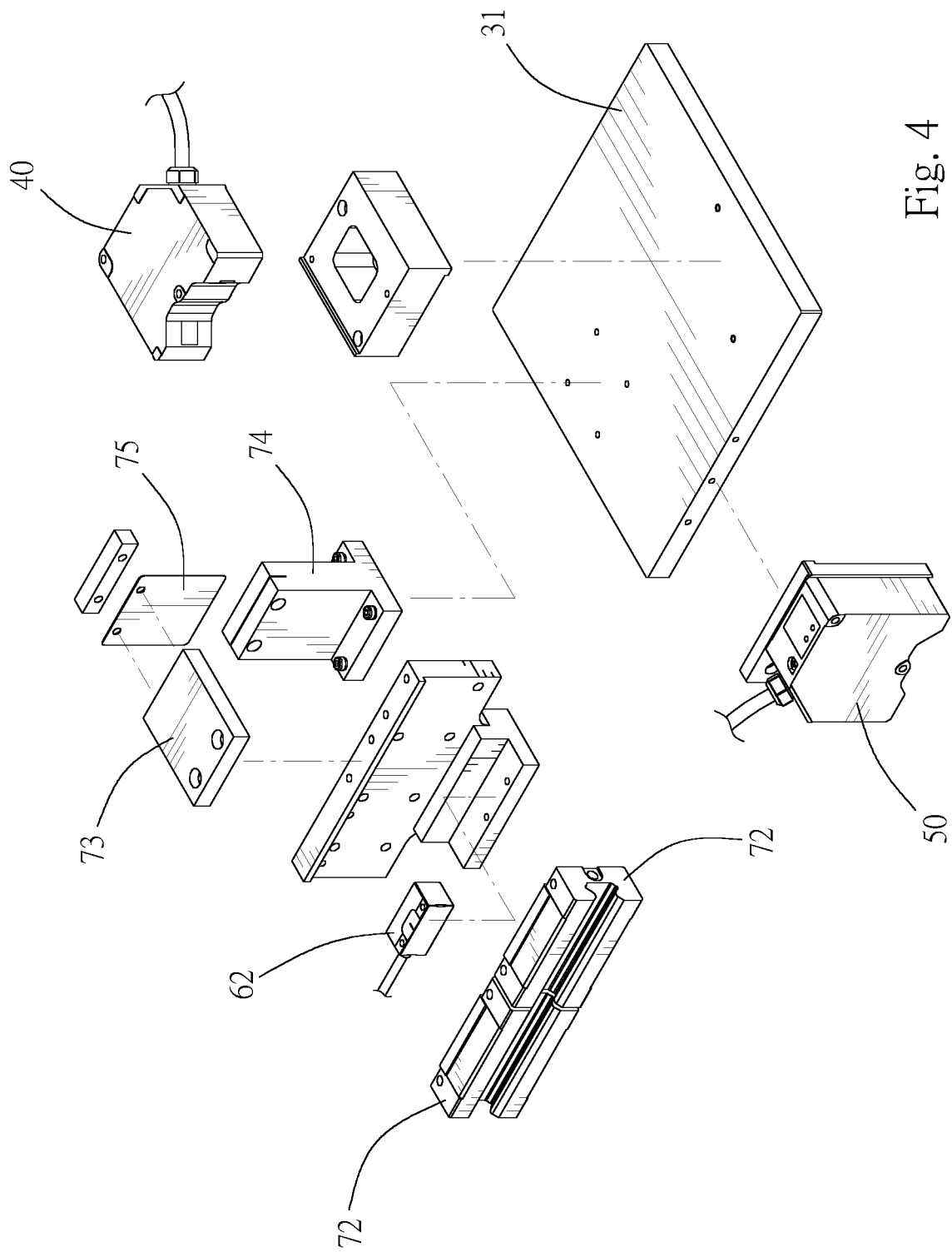
FIG. 4 is a partial exploded view of some elements of a quick measurement module according to a preferred embodiment of the present invention.
Figure 5:
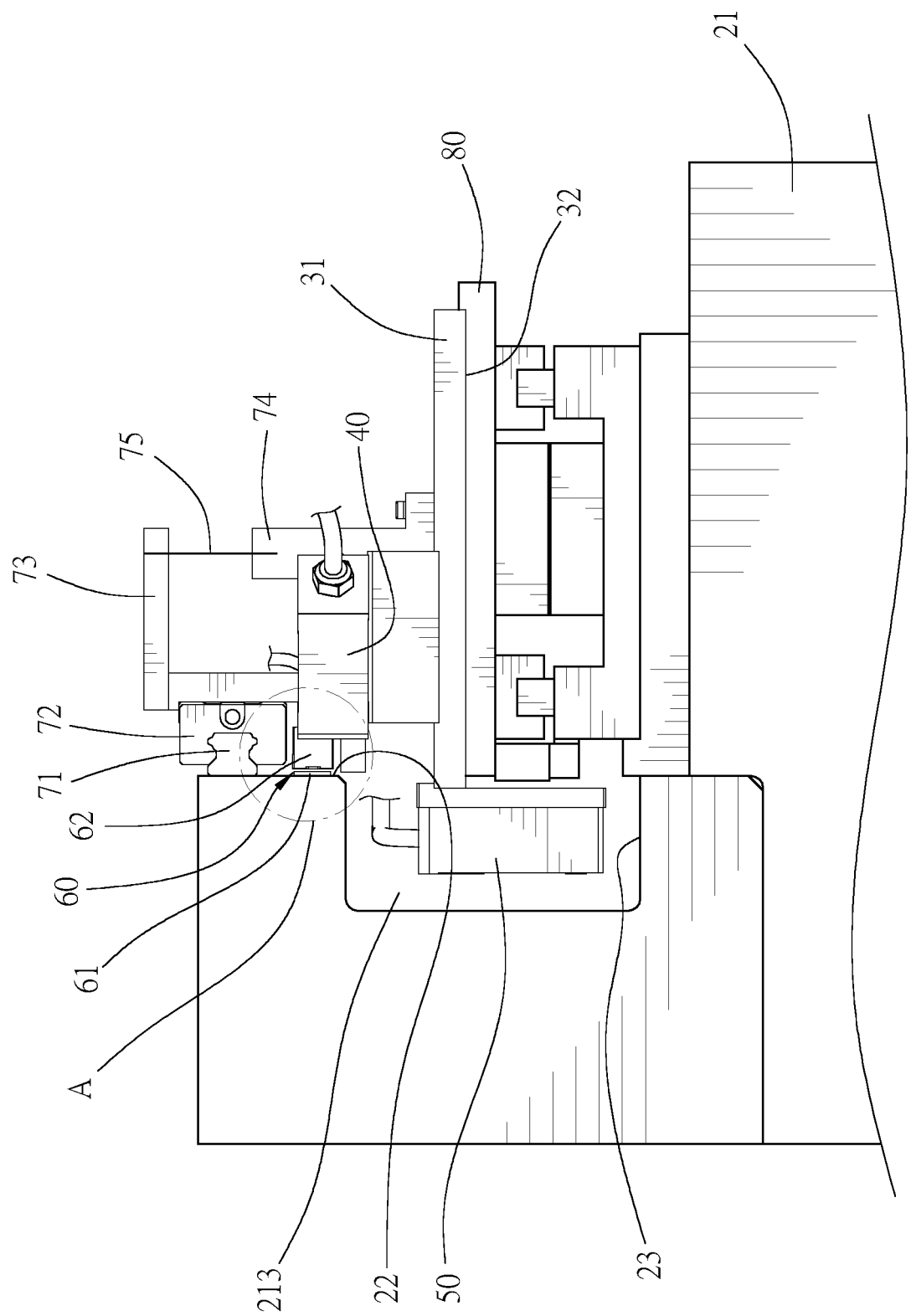
FIG. 5 is a left side view of a quick measurement module according to a preferred embodiment of the present invention.
Figure 6:
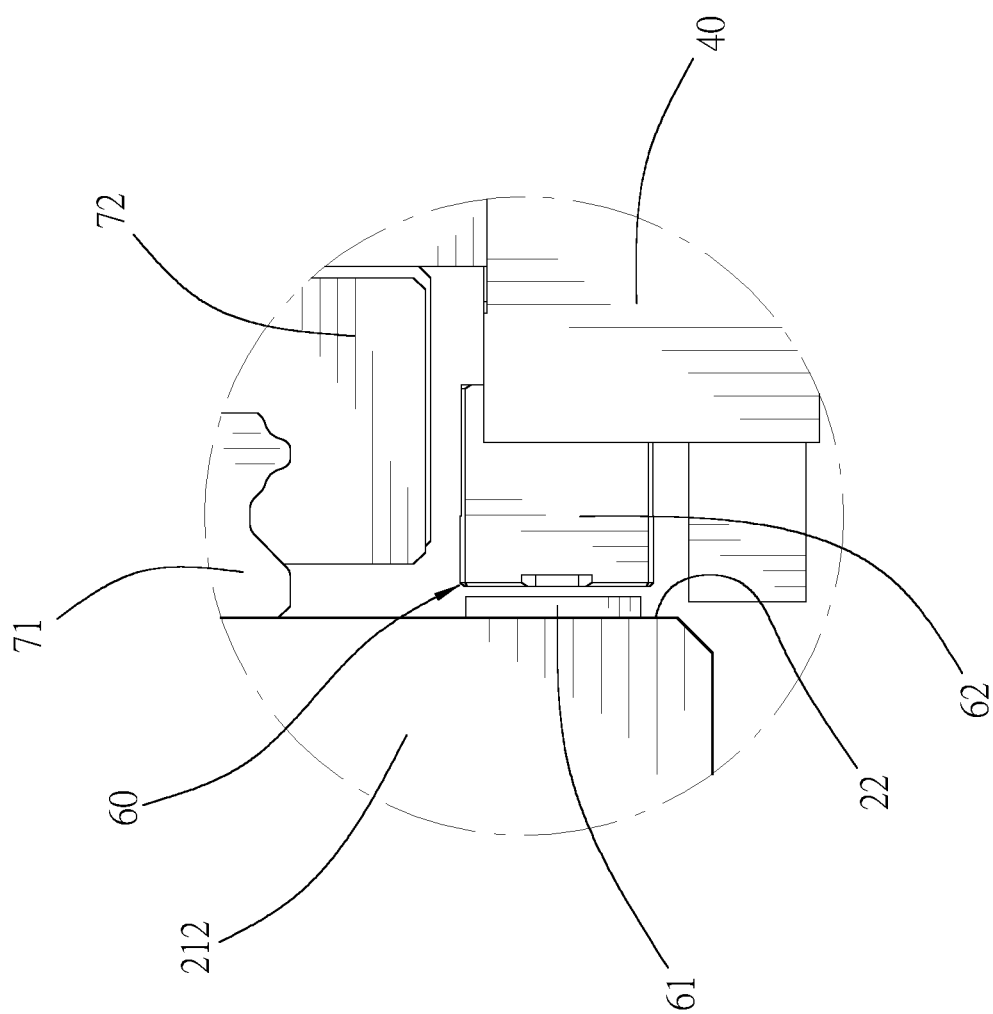
FIG. 6 is an enlarged partial view along the region A in FIG. 5 of a quick measurement module according to a preferred embodiment of the present invention.
Figure 7:
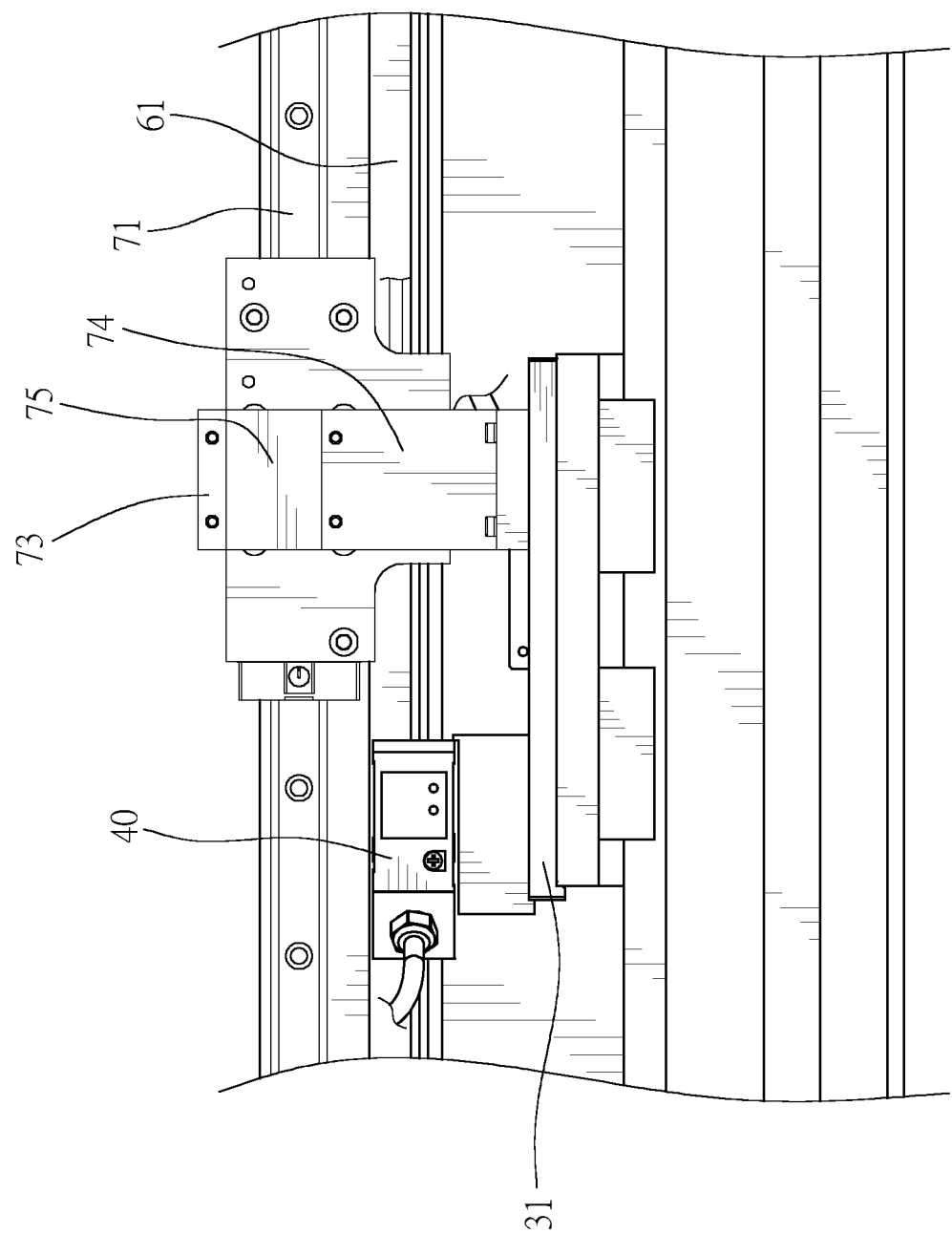
FIG. 7 is a partial front view of a quick measurement module according to a preferred embodiment of the present invention.

With reference to FIGS. 1 to 7, a quick measurement module (10) according to a preferred embodiment of the present invention includes, among others, a stationary seat (20), a movable seat (30), a first distance sensing unit (40), a second distance sensing unit (50), and a position sensing unit (60).

The stationary seat (20) has a stationary seat body (21), a first reference plane (22), and a second reference plane (23). The stationary seat body (21) has a seat block (211) in the shape of an elongated-rectangular block, a side block (212) secured to a side of the seat block (211) and protruded above, and a groove (213) recessed from an inner side face (2121) of the side block (212) adjacent to the upper side seat face (2111) of the seat block (211). The portion of the inner side face (2121) adjacent to the upper portion of the mouth of the groove (213) forms the first reference plane (22), and a side wall face (2131) of the groove (213) parallel to the upper side seat face (2111) forms the second reference plane (23), so that the first reference plane (22) and the second reference plane (23) are perpendicular to each other.

The movable seat (30) is not secured to the stationary seat (20). It serves as a separate movable element having, in configuration, a movable seat body (31) of a sheet-shape as an element for bearing some elements of the first distance sensing unit (40), the second distance sensing unit (50), and the position sensing unit (60) and is adapted to be jointed to the object under detection (80). For the purpose of jointing of the movable seat (30) to the object under detection (80), the movable seat (30) may have a bottom side sheet face of the movable seat body (31) as a joint face (32). The movable seat (30) can be placed directly on the object under detection (80) via the joint face (32), and then secured to the object under detection (80) through the conventional technique of securing via jointing.

The first distance sensing unit (40) and the second distance sensing unit (50) are laser locators having the function of di stance sensing that are individually secured to the movable seat body (31). The first distance sensing unit (40) and the second distance sensing unit (50) have different sensing directions. That is, the first distance sensing unit (40) is configured to sense in a first sensing direction, and the second distance sensing unit (50) is configured to sense in a second sensing direction.

The position sensing unit (60) uses the conventional technique of coordinate measurement. Specifically, a conventional optical ruler is used as an example in this embodiment. The ruler (61) is pressed against part of the first reference plane (22), and the sensing portion (62) is secured to the movable seat body (31).

Prior to the use of the quick measurement module (10), an object under detection (80), such as a motion platform, is appropriately mounted on the seat block (211) of the stationary seat body (21). The joint face (32) of the movable seat (30) is pressed against the surface of the object under detection (80), i.e., the motion platform. Then the movable seat body (31) is secured to the object under detection (80) through a conventional securing technique. As such, the movable portion (30) can be displaced back and forth linearly along with the object under detection (80) along a virtual shifting axis (24) parallel to the long axis of the seat block (211), so that the movements of the movable portion (30) and the object under detection (80) are synchronized.

While the movable portion (30) is secured to the object under detection (80), the first distance sensing unit (40), the second distance sensing unit (50), and the sensing portion (62) of the position sensing unit secured to the movable portion (30) are positioned as well. The first sensing direction of the first distance sensing unit (40) is oriented towards the first reference plane (22) to sense the distance from the first reference plane (22). Likewise, the second sensing direct ion of the second distance sensing unit (50) is oriented towards the second reference plane (23) to sense the distance from the second reference plane (23). Furthermore, the sensing portion (62) and the ruler (61) provide together a conventional technique of coordinate measurement to measure the coordinates of the spatial position of the movable port ion (30) and consequently acquire its position.

Assembly as described above enables the movable seat (30) and the object under detection (80) to be moved synchronously. That is, an external driving force causes the object under detection (80) to be displaced back and forth linearly along the shifting axis (24). During the movement, the first distance sensing unit (40) continuously senses the distance from the first reference plane (22). Likewise, the second distance sensing unit (50) also continuously senses the distance from the second reference plane (23). From these distances, in combination with coordinate information provided by the position sensing unit (60), it is possible to acquire the horizontal linearity accuracy of the object under detection (80) with reference to the first reference plane (22) and the vertical linearity accuracy with reference to the second reference plane (23) during linear movement. By use of the information of the horizontal linearity accuracy and vertical linearity accuracy combined with the coordinate information sensed by the position sensing unit (60), it is possible to detect the repetition accuracy of the object under detection (80). In this way, the quick measurement module (10) can quickly accomplish detection of the object under detection (80) without the complicated operations involved in conventional detection by laser interferometers, thereby having improved detection efficiency while providing detection data as accurate as those provided by laser interferometers.

Further, in this embodiment, to ensure stability of the movable seat (30) during movement and avoid the situation in which the movable seat (30) suffers from unexpected shaking or vibration due to stresses caused by assembly or momentum in movement, leading to compromised correctness of the detection results, the quick measurement module (10) further includes a rectification mechanism (70) configured to ensure stability of the movable seat (30) during movement.

With reference to FIGS. 1 to 7, the rectification mechanism (70) has a guide rail (71) extending linearly and secured to the other portion of the second reference plane (23), parallel to the shifting axis (24) as the ruler (61); two sliders (72) provided slidably on the guide rail (71) and capable of back-and-forth movement on the guide rail (71); an arm (73) having one end secured to the sliders (72) and the other end protruding and suspended above the movable seat body (31); a jointer (74) secured to the movable seat body (31) and positioned below the other end of the arm (73); and a flexible member (75) bridged between the jointer (74) and the arm (73).

Further, the flexible member (75) is a thin sheet made from metal with a thickness perpendicular to the shifting axis (24). As such, the flexible member (75) provides suitable rigid support to the movable seat body (31) along the shifting axis (24), so as to prevent it from undesired displacements due to the momentum during back-and-forth movement. Meanwhile, it provides an elastic force perpendicular to the shifting axis (24) so as to eliminate the residual stresses on the movable seat body (31) during assembly that may lead to compromised position accuracy. In this way, the accuracy of measurement by the quick measurement module (10) is ensured, while requirements on the assembly quality during detection are lowered, thereby facilitating the operation.

REFERENCE NUMBERS

(10) quick measurement module
(20) stationary seat
(21) stationary seat body
(211) seat block
(2111) upper side seat face
(212) side block
(2121) inner side face
(213) groove
(2131) side wall face
(22) first reference plane
(23) second reference plane
(24) shifting axis
(30) movable seat
(31) movable seat body
(32) joint face
(40) first distance sensing unit
(50) second distance sensing unit
(60) position sensing unit
(61) ruler
(62) sensing portion
(70) rectification mechanism
(71) guide rail
(72) slider
(73) arm
(74) jointer
(75) flexible member
(80) object under detection

What is claimed is:

1. A quick measurement module, comprising:
a stationary seat having a stationary seat body and a first reference plane and a second reference plane provided individually on the stationary seat body and extending linearly along a virtual shifting axis, the first reference plane and the second reference plane being spaced apart by an included angle;
a movable seat capable of linear displacement along the axial direction of the shifting axis within the extension range of the first reference plane and the second reference plane;
a first distance sensing unit secured to the movable seat and having a first sensing direction oriented towards the first reference plane, configured to sense the distance from the first reference plane, the first distance sensing unit has a photosensor, the photosensor is a laser locator;
a second distance sensing unit secured to the movable seat and having a second sensing direction oriented towards the second reference plane, configured to sense the distance from the second reference plane;
a position sensing unit configured to sense the position of the movable seat during its movement along the shifting axis; and
a rectification mechanism bridged between the stationary seat body and the movable seat, configured to ensure stability of the movable seat during movement;
whereby when the movable seat is moved linearly along the shifting axis, the first distance sensing unit and the second distance sensing unit sense respectively the distances of the movable seat from the first reference plane and second reference plane during its displacement so as to acquire the linearity accuracy of the movable seat in movement and have it combined with the position information provided by the position sensing units so as to acquire the repetition accuracy of the movable seat;
wherein the first distance sensing unit, the second distance sensing unit, and the rectification mechanism are connected to the moveable seat.

2. The quick measurement module of claim 1, wherein the first reference plane and the second reference plane are perpendicular to each other.

3. The quick measurement module of claim 1, wherein the movable seat has a movable seat body and a joint face on one side of the movable seat body and parallel to the shifting axis.

4. The quick measurement module of claim 3, wherein the joint face is parallel to the second reference plane.

5. The quick measurement module of claim 2, wherein the movable seat has a movable seat body and a joint face on one side of the movable seat body and parallel to the shifting axis.

6. The quick measurement module of claim 5, wherein the joint face is parallel to the second reference plane.

7. The quick measurement module of claim 1, wherein the rectification mechanism has a guide rail provided on the stationary seat body and extending linearly parallel to the shifting axis, a slider provided slidably on the guide rail, an arm having one end secured to the slider and the other end protruding above the movable seat, a jointer secured to the movable seat, and a flexible member bridged between the arm and the jointer.

8. The quick measurement module of claim 7, wherein the flexible member has a sheet shape with the thickness of the sheet of the flexible member perpendicular to the shifting axis.

9. The quick measurement module of claim 8, wherein the flexible member is made of metal.

* * * * *